2 Sheets—Sheet 1.

W. T. NICHOLS.
IRONING MACHINE.

No. 35,034.            Patented Apr. 22, 1862.

Witnesses:

Inventor:

2 Sheets—Sheet 2.

W. T. NICHOLS.
IRONING MACHINE.

No. 35,034.  Patented Apr. 22, 1862.

Witnesses:  Inventor:

UNITED STATES PATENT OFFICE.

WILLIAM T. NICHOLS, OF RUTLAND, VERMONT.

IMPROVED IRONING-MACHINE.

Specification forming part of Letters Patent No. 35,034, dated April 22, 1862.

*To all whom it may concern:*

Be it known that I, WILLIAM T. NICHOLS, of Rutland, in the county of Rutland and State of Vermont, have invented a new and useful Machine for Ironing and Polishing Clothes; and I do hereby declare that the following is a clear, full, and exact description of the same, reference being had to the annexed drawings, forming a part of my specification, and the letters of reference marked thereon, and in which drawings—

Figure 1:
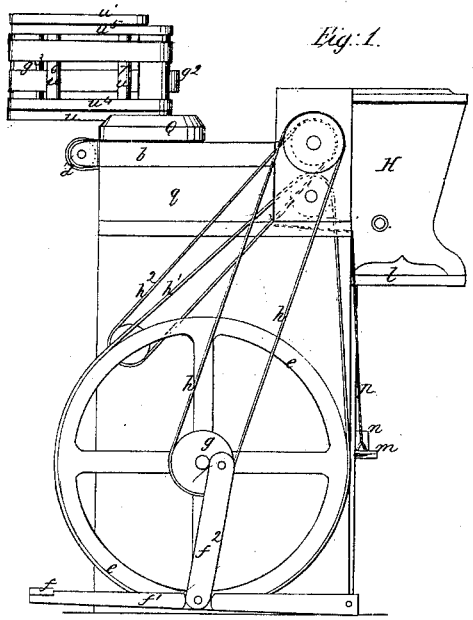
Figure 2:
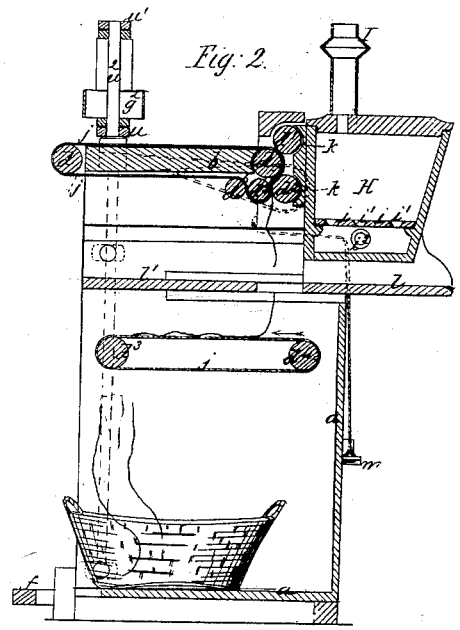
Figure 3:
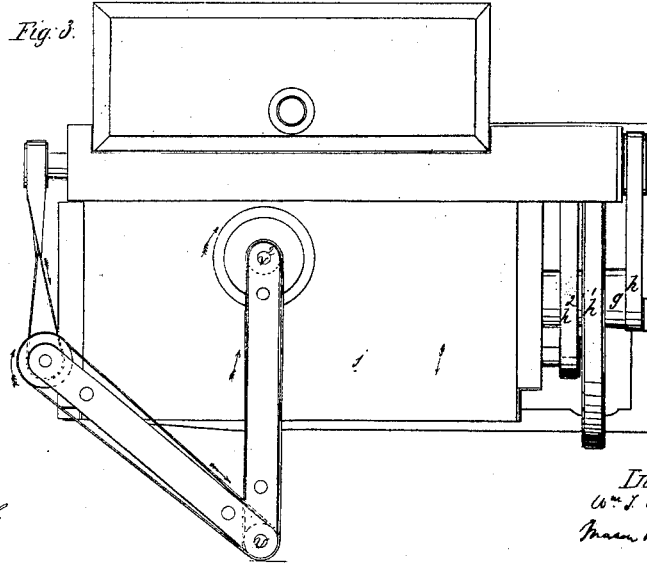

Figure 1 is a side elevation of my machine, Fig. 2, a cross-section thereof; Fig. 3, a plan view, and Fig. 4 a front elevation.

In the drawings, $a$ indicates the frame, which may be four feet in length, two feet wide, and three feet high and constructed of any proper material by fastening the bottom ends and back together in a firm and substantial manner. The top of the machine is formed into an ironing-table, $b$, constructed to slide back and forth on supports $q$, running in grooves $c$, as clearly shown in Fig. 4. To the supports $q$, as shown in the figures, rollers $d$, one inch in diameter, are fitted, and with a continuous apron, $j$, of strong cloth, passing around them.

$e$ is a balance-wheel, which for practical purposes may be twenty-seven inches in diameter and of eighty pounds weight, worked by a treadle, as indicated at $f$ $f'$ $f^2$, or by a belt which may be made to run around a circular flange attached to the outer end of the pulley $g$.

$d'$ and $d^2$ indicate solid turned iron rollers situated upon the outside upper edge of the frame, and are suitably held in place by cast-iron bearings which are fastened to the frame. These rollers are caused to revolve about three-fourths of an inch apart, but at different rates of speed, the upper roller, $d'$, being driven by the band $h$ from the pulley $g$, and the lower roller, $d^2$, being driven relatively at a high rate of speed by the band $h'$ from the wheel $e$. The said rollers $d'$ $d^2$ are heated by the fire-box H, which is provided with a fire-bed, $i$, and with air-passages $i'$ $i^2$, as shown. This fire-box is made with concave surfaces $k$ $k$, to receive the rollers $d'$ $d^2$, as clearly represented in Fig. 2, and thus have heat imparted to them while they are in motion, said box being placed upon a sliding shelf, $l$, so as to be adjusted at the will of the operator in contact with said rollers, or removed a distance from them, as the heat necessary for them may require. A second continuous apron, $j'$, revolves from the back to the front of the machine upon rollers $d^3$ $d^4$, driven by a band, $h^2$, from roller $d'$, as represented in the figures.

The ironing-table, with its appendages, is held in close proximity with the heated rollers $d'$ $d^2$ by means of a spring, $m$, beneath a block, $n$, attached to the rear of the frame, from which cords $p$, fastened to the ends of the spring, pass up and are secured to the rear end of the supports $q$ of the ironing-table $b$, as shown in Figs. 1 and 2. Any other suitable means may be adopted for holding the ironing-table in such position.

Figure 4:
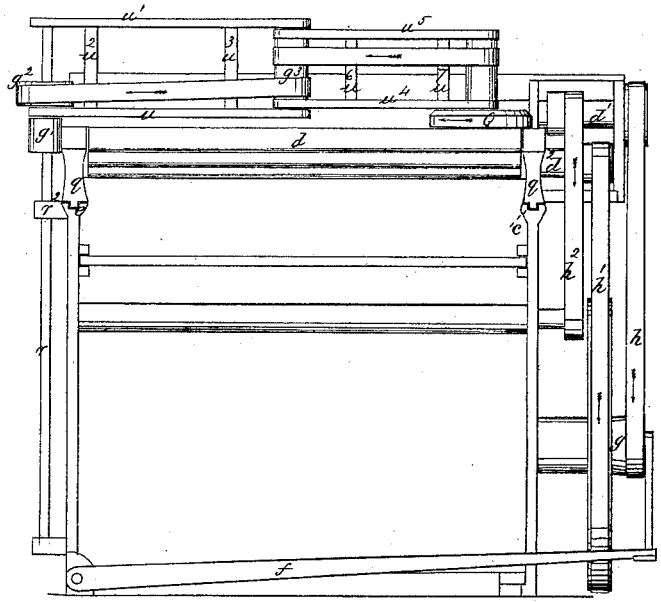

In Figs. 3 and 4 I have clearly shown a device for rotating a "flat-iron," and which is so arranged as to be used upon the ironing-table $b$ and heated upon the fire-box H. For this latter purpose it is sufficient to simply raise the shaft $r$ from its socket $r'$, and then so manipulate the frame which carries the flat-iron as to allow of the iron being placed upon the top of the fire-box.

The device for operating the flat-iron consists of an upright shaft, $r$, loosely stepped in bearing $r'$, and sustained by bearing $r^2$, through which it passes, and through which it may be elevated, carrying with it its attachments, whenever it becomes necessary to pass the flat-iron from the table $b$ to the top of the fire-box H. Upon this shaft pulleys $g'$ and $g^2$ are so secured that the shaft will rotate with them. These pulleys are so arranged as to embrace between them the lower lengthwise piece, $w$, of the frame designated by $w$, $w'$, $w^2$, and $w^3$, the parts $w^2$ and $w^3$ being connecting-uprights and securely fastened to the lengthwise pieces $w$ and $w'$. A like frame is indicated by $w^4$, $w^5$, $w^6$, and $w^7$, so hinged as to articulate upon the journals $v$ of a pulley, $g^3$, the inner or first-named frame being so arranged as to have its inner ends also articulate upon the journals $v$ and its outer ends upon the shaft $r$. To the outer end of one of these frames I attach a circular flat-iron, Q, with a central rod, $v^2$, rising from its top and passing through the ends $w^4$ and $w^5$ of the frame, between which ends a pulley, $g^4$, is secured to the rod $v^2$, so that when the pulley is rotated the flat-iron will rotate also. Bands $h^3$, $h^4$, and $h^5$ impart motion to the flat-iron, as indicated, and the movements of the several parts, when the machine is in operation, are indicated by the arrows in red.

The operation is as follows: When the machine is in motion, the article to be ironed is placed on the apron $j$ of the table $b$. It is then carried slowly by the apron between the roller $d$ and heated roller $d'$ at the back side of the table, thence between the heated roller $d^2$ and loose roller $d^5$, and thence down and upon the apron $j$, from which it is delivered into the basket at the bottom of the machine.

By this operation the article to be ironed is first subjected to the action of the heated slow-speed roller $d'$, which effects the first work of ironing, while by its rotation being slower than the heater roller $d^2$ the garment is prevented from being too rapidly delivered from off the apron $j$. From contact with the heated roller $d'$ the garment is next subjected to the action of the rapidly-rotating heated roller $d^2$, which by reason of its great speed performs the principal work of ironing, at the same time giving a fine polish and delicate finish to the garment subjected to its action. It will be observed that intermediate between the heated roller $d^2$ and the roller $d^6$ a loose roller, $d^5$, resting simply upon the apron $j$, as shown, is interposed, and that the diameter of the roller $d^5$ is greater than that of $d^6$. Thus the rollers $d^6$ and $d^5$ being so relatively placed as to have their upper surface on the same horizontal plane, and with the roller $d^6$ pressing against the roller $d^5$, the action of the latter upon the garment being ironed will be to cause a considerable frictional impact of the heated roller $d^2$ upon the garment below the axial line of the roller $d^2$. In other words, the longitudinal axes of the rollers $d^2$ and $d^6$ are on the same horizontal plane above the longitudinal axis of the loose roller $d^5$, and the diameter of the heated roller $d^2$ being the greatest the effect upon the article being ironed is, as above stated, when the several rollers $d$, $d'$, $d^2$, $d^5$, and $d^6$ maintain their relative position, as shown in Fig. 2 of the drawings.

$l'$ indicates a sliding shelf situated between the sides of the main frame, and upon which the dampened clothes are deposited preparatory to placing them upon the ironing-table $b$, and as the clothes are ironed and pass from between the rollers $d^2$ and $d^5$ they drop down between the sliding shelves $l$ and $l'$ onto the apron $j$, and thence are delivered into the basket below.

From the foregoing description it will be perceived that the operator, by grasping the frame which immediately supports the flat-iron, can with ease manipulate the said iron over all parts of the table $b$, and thus in a rapid manner iron all such articles as are not adapted to pass between the rollers, the flat-iron meantime revolving at a high rate of speed. It will also be seen that by my organization the ironing-rollers $d'$ and $d^2$ may be externally heated, and this while they are being rotated and in the act of ironing; and, further, that the heat of such rollers may readily be regulated at the will of the operator.

I do not confine myself to the heating of the fire-box H merely by coal or wood placed upon the fire-plate $i$, as a sufficient heat may be applied therein by an obvious arrangement of alcohol-burners or gas-jets, in all of which cases the products of combustion will pass off through the pipe I.

Having thus described my invention, what I claim as new, and desire to secure by Letters Patent of the United States, is—

1. A smoothing-iron revolved horizontally by machinery and capable of adjustment at pleasure upon any part of the ironing-table and also upon the top of the fire-box, substantially as described.

2. Heating rollers externally while they are revolved for the purpose of ironing, substantially as set forth.

3. So applying a heated roller for the purpose of ironing that it shall prevent the too rapid forward movement of the garment at the same time that it performs the act of ironing, substantially as described.

4. So applying heated rollers for the purpose of ironing that they shall revolve at varying rates of speed, for the purpose set forth, substantially as described.

WM. T. NICHOLS.

Attest:
JOHN S. HOLLINGSHEAD,
D. ROWLAND.